(12) United States Patent
Teraoka et al.

(10) Patent No.: US 12,224,122 B2
(45) Date of Patent: *Feb. 11, 2025

(54) ELECTRONIC COMPONENT, CIRCUIT BOARD, AND METHOD OF MOUNTING ELECTRONIC COMPONENT ON CIRCUIT BOARD

(71) Applicant: Murata Manufacturing Co., Ltd., Nagaokakyo (JP)

(72) Inventors: Eiji Teraoka, Nagaokakyo (JP); Hirokazu Takashima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,687

(22) Filed: Oct. 13, 2023

(65) Prior Publication Data

US 2024/0055185 A1    Feb. 15, 2024

Related U.S. Application Data

(63) Continuation of application No. 18/098,786, filed on Jan. 19, 2023, now Pat. No. 11,817,263, which is a (Continued)

(30) Foreign Application Priority Data

Oct. 4, 2018   (JP) .................................. 2018-189163

(51) Int. Cl.
*H01G 4/12*        (2006.01)
*H01G 4/012*       (2006.01)
(Continued)

(52) U.S. Cl.
CPC ............... *H01G 4/12* (2013.01); *H01G 4/012* (2013.01); *H01G 4/228* (2013.01); *H01G 4/30* (2013.01)

(58) Field of Classification Search
CPC .......... H01G 4/012; H01G 4/12; H01G 4/228; H01G 4/30
See application file for complete search history.

(56) References Cited

U.S. PATENT DOCUMENTS 11,587,731 B2 *  2/2023  Teraoka ............... H01G 4/1236
11,817,263 B2 *  11/2023 Teraoka ............... H01G 4/1236
(Continued)

OTHER PUBLICATIONS

Teraoka et al., "Electronic Component, Circuit Board, and Method of Mounting Electronic Component on Circuit Board", U.S. Appl. No. 18/098,786, filed Jan. 19, 2023.

*Primary Examiner* — Nathan Milakovich
(74) *Attorney, Agent, or Firm* — Keating & Bennett, LLP

(57) ABSTRACT

An electronic component includes a laminate in which first internal electrodes and second internal electrodes are alternately laminated in a lamination direction with dielectric layers interposed therebetween, the laminate including a first main surface and a second main surface opposite to each other in the lamination direction, a first side surface and a second side surface opposite to each other in a width direction, and a first end surface and a second end surface opposite to each other in a length direction, a first external electrode provided on a surface of the laminate and electrically connected to the first internal electrodes, a second external electrode provided on a surface of the laminate and electrically connected to the second internal electrodes, and side margin portions each including a dielectric including Ca, Zr, and Ti.

20 Claims, 6 Drawing Sheets

Related U.S. Application Data continuation of application No. 17/544,992, filed on Dec. 8, 2021, now Pat. No. 11,587,731, which is a continuation of application No. 16/581,847, filed on Sep. 25, 2019, now Pat. No. 11,232,907.

(51) Int. Cl.
*H01G 4/228* (2006.01)
*H01G 4/30* (2006.01)

(56) References Cited

U.S. PATENT DOCUMENTS

2016/0381802 A1* 12/2016 Taniguchi ............. H01G 4/008
   174/260
2017/0018363 A1* 1/2017 Tanaka .................... H01G 4/30
2017/0243697 A1* 8/2017 Mizuno ............... H01G 4/1227
2018/0108482 A1* 4/2018 Kogure ................. H01G 4/224

* cited by examiner

ELECTRONIC COMPONENT, CIRCUIT BOARD, AND METHOD OF MOUNTING ELECTRONIC COMPONENT ON CIRCUIT BOARD

CROSS REFERENCE TO RELATED APPLICATIONS

This application claims the benefit of priority to Japanese Patent Application No. 2018-189163 filed on Oct. 4, 2018. The entire contents of this application are hereby incorporated herein by reference.

BACKGROUND OF THE INVENTION

1. Field of the Invention

The present invention relates to an electronic component, a circuit board on which the electronic component is mounted, and a method of mounting the electronic component on the circuit board.

2. Description of the Related Art

Conventionally, when power supply voltage supplied to an IC fluctuates, circuit operation of the IC becomes unstable. Therefore, there has been known a method of stabilizing the circuit operation of the IC by inserting a capacitor between a power supply pin of the IC and the ground.

As one of such capacitors, JP 2004-342846 A describes a multilayer ceramic capacitor, including a laminate in which a plurality of first internal electrodes and a plurality of second internal electrodes are alternately laminated with dielectric layers interposed therebetween, a first external electrode formed on a first end surface of the laminate and electrically connected to the first internal electrodes, and a second external electrode formed on a second end surface of the laminate and electrically connected to the second internal electrodes.

Here, as a capacitor having high frequency characteristics, there has been known a temperature compensating capacitor in which titanium oxide, calcium zirconate, and the like are included in a dielectric layer. However, the temperature compensating capacitor has a problem that the capacitance per volume is small.

SUMMARY OF THE INVENTION

Preferred embodiments of the present invention provide electronic components which are each able to significantly improve high frequency characteristics and electronic component characteristics including, for example, capacitance per volume.

According to a preferred embodiment of the present invention, an electronic component includes a laminate in which first internal electrodes and second internal electrodes are alternately laminated in a lamination direction with dielectric layers interposed between the first internal electrodes and the second internal electrodes, the laminate including: a first main surface and a second main surface opposite to each other in the lamination direction; a first side surface and a second side surface opposite to each other in a width direction orthogonal or substantially orthogonal to the lamination direction; and a first end surface and a second end surface opposite to each other in a length direction orthogonal or substantially orthogonal to the lamination direction and the width direction; a first external electrode provided on a surface of the laminate and electrically connected to the first internal electrodes; and a second external electrode provided on a surface of the laminate and electrically connected to the second internal electrodes, in which, when a cross section including the length direction and the width direction of the laminate is viewed from the lamination direction, side margin portions each include a dielectric including Ca, Zr, and Ti, each of the side margin portions being a region in which none of the first internal electrodes and the second internal electrodes are disposed.

Each of the dielectric layers between each of the first internal electrodes and the second internal electrodes may include a dielectric material including Ba and Ti as main components.

A dimension of each of the side margin portions in the width direction may be about 5 μm or more and about 30 μm or less.

The number of laminated internal electrodes including the first internal electrodes and the second internal electrodes may be about 10 or more and about 500 or less. A distance between the first main surface and the internal electrode at a position closest to the first main surface among the first internal electrodes and the second internal electrodes may be about 5 μm or more and about 30 μm or less. A distance between the second main surface and the internal electrode at a position closest to the second main surface among the first internal electrodes and the second internal electrodes may be about 5 μm or more and about 30 μm or less.

The first internal electrodes and the second internal electrodes may each include Cu.

The electronic component may have a dimension in the length direction of about 0.2 mm or more and about 3.2 mm or less, a dimension in the width direction of about 0.1 mm or more and about 1.6 mm or less, and a dimension in the lamination direction of about 0.1 mm or more and about 1.6 mm or less.

A circuit board according to a preferred embodiment of the present invention is a circuit board on which the electronic component described above is mounted, and the electronic component is mounted so that the side margin portions thereof face a mounting surface of the circuit board.

A distance between an end portion of the electronic component on the circuit board side and the mounting surface of the circuit board may be about 20 μm or more and about 50 μm or less.

A method of mounting an electronic component of according to a preferred embodiment the present invention on the circuit board is a method of mounting the electronic component described above on a circuit board, and includes mounting the electronic component so that the side margin portions of the electronic component face the mounting surface of the circuit board.

According to the electronic components of preferred embodiments of the present invention, for example, when current flows in a state in which the electronic component is mounted so that the side margin portions face the mounting surface of the circuit board, in a high frequency band, due to surface effects, the current flows in the vicinity of the surface of the internal electrode closest to the mounting surface of the circuit board. Since the side margin portion includes a dielectric with Ca, Zr, and Ti, current loss is small, and the high frequency characteristics are able to be significantly improved. Further, for example, with a configuration in which the electronic component is a capacitor and the dielectric layer between the first internal electrode and the second internal electrode includes Ba and Ti, the capacitance per volume of the capacitor is able to be increased.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A and 5B are views of an example of a method of manufacturing the multilayer ceramic capacitor according to the preferred embodiment of the present invention, in which FIG. 5A is a schematic view of a ceramic green sheet on which conductive films are provided, and FIG. 5B is a schematic view of a state in which the ceramic green sheets on which the conductive films are provided are being laminated.

DETAILED DESCRIPTION OF THE PREFERRED EMBODIMENTS

Hereinafter, the features of the present invention will be specifically described by describing preferred embodiments of the present invention. In the following, a multilayer ceramic capacitor is described as an example of an electronic component of the present invention. However, the electronic component is not limited to the multilayer ceramic capacitor, and may be another electronic component such as, for example, an inductor or an LC filter.

Figure 1:
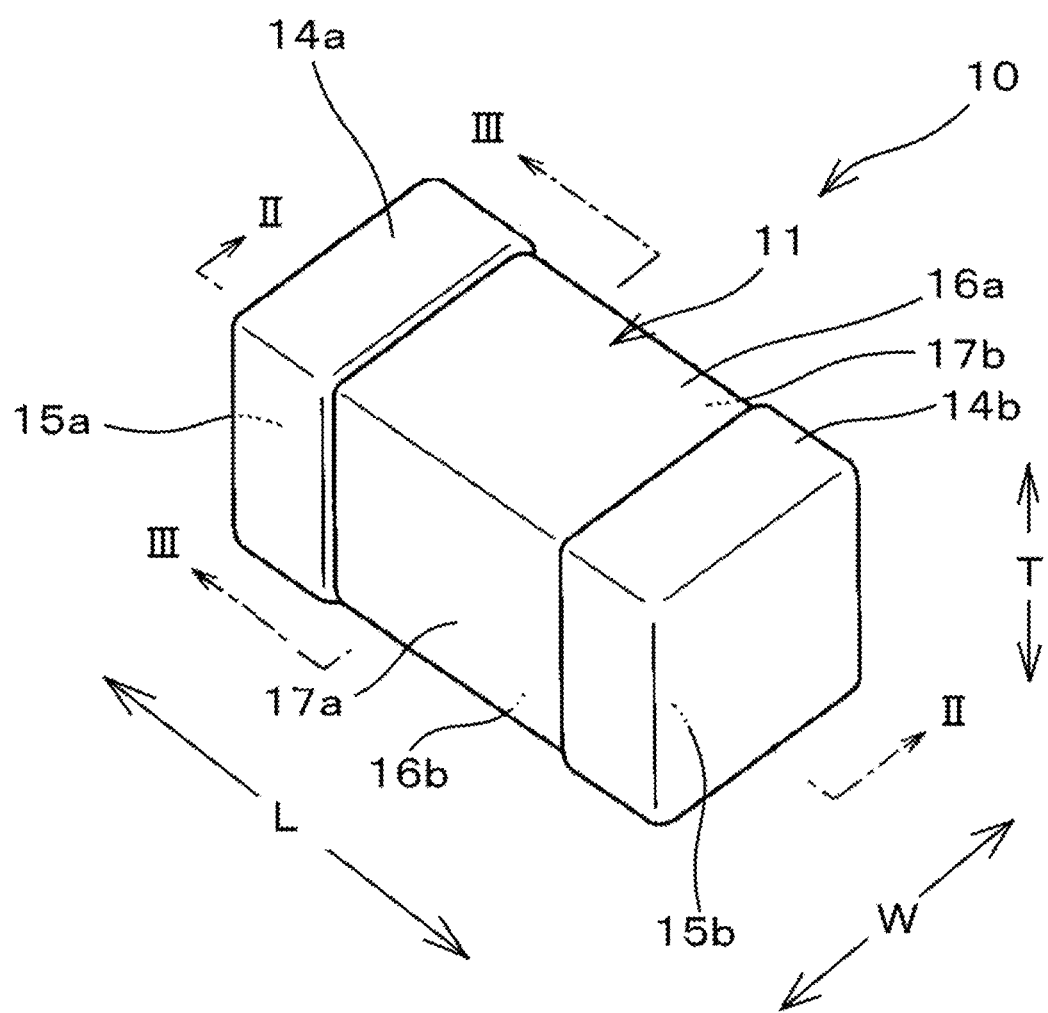
FIG. 1 is a perspective view of an example of a multilayer ceramic capacitor according to a preferred embodiment of the present invention.
Figure 2:
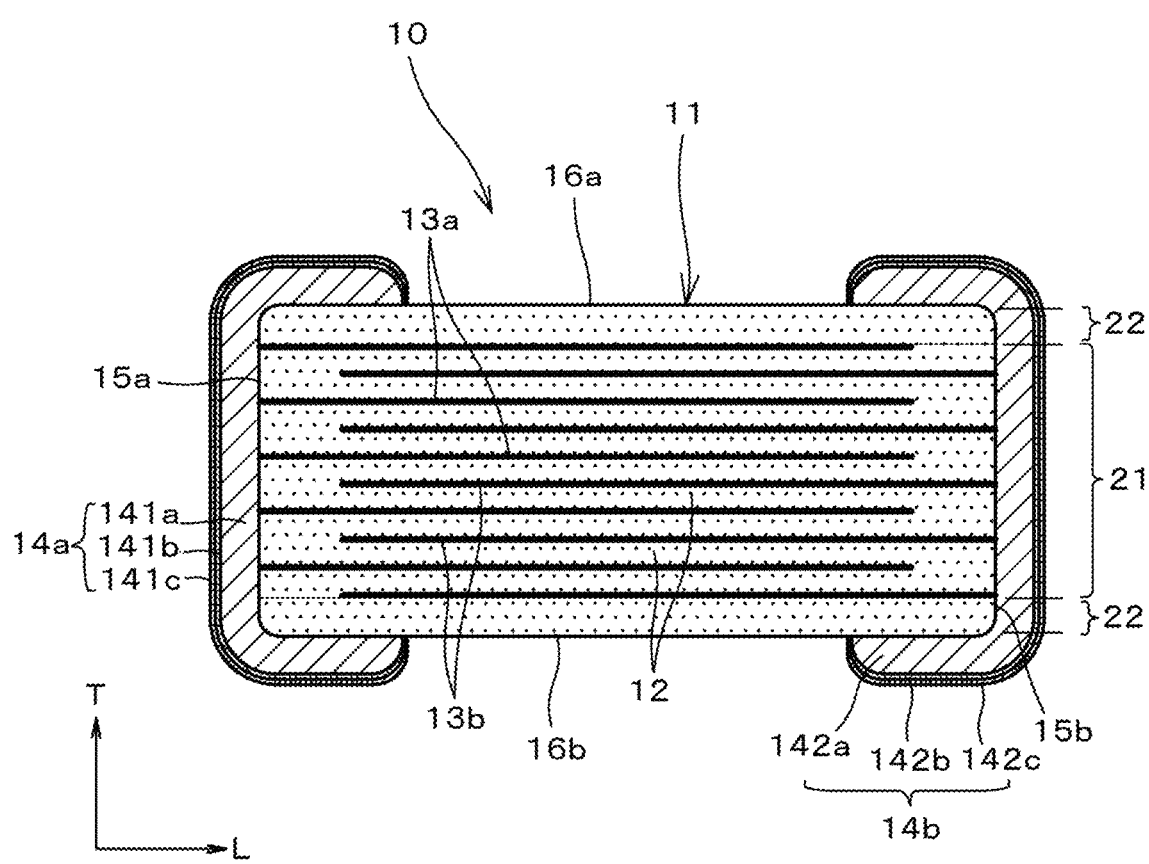
FIG. 2 is a cross-sectional view of a multilayer ceramic capacitor illustrated in FIG. 1 along the line II-II.
Figure 3:
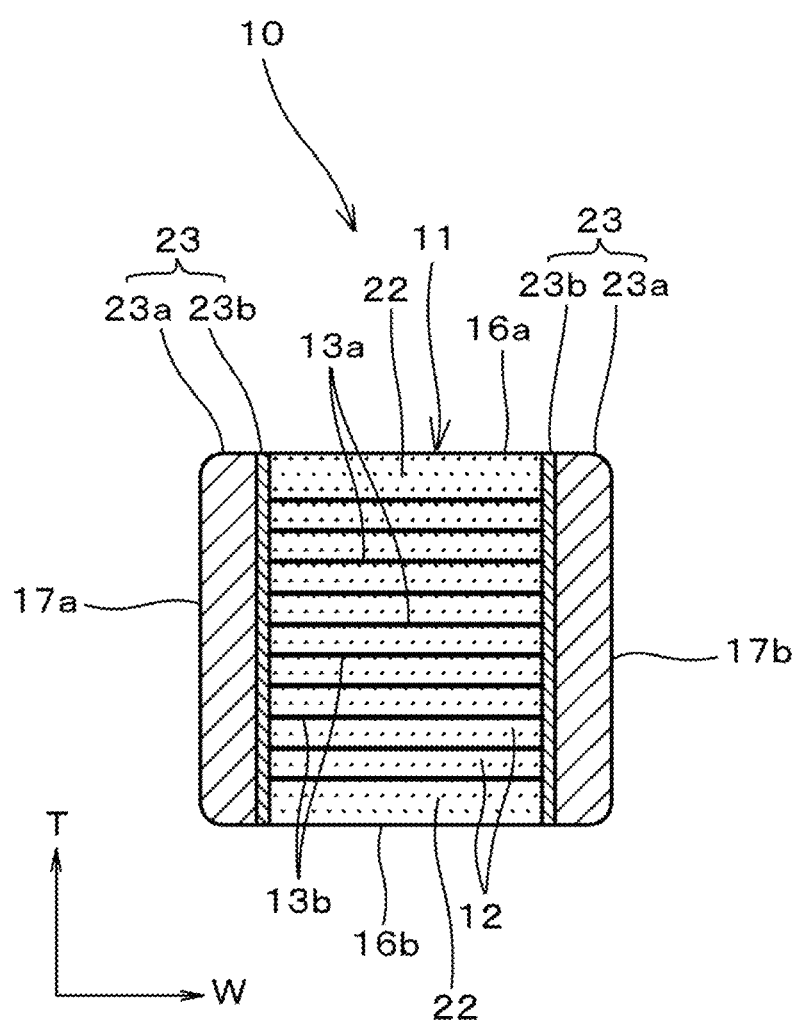
FIG. 3 is a cross-sectional view of the multilayer ceramic capacitor illustrated in FIG. 1 taken along the line III-III.

FIG. 1 is a perspective view of an example of a multilayer ceramic capacitor 10 according to a preferred embodiment of the present invention. FIG. 2 is a cross-sectional view of the multilayer ceramic capacitor 10 illustrated in FIG. 1 along the line II-II. FIG. 3 is a cross-sectional view of the multilayer ceramic capacitor 10 illustrated in FIG. 1 taken along the line III-III.

As illustrated in FIGS. 1 to 3, the multilayer ceramic capacitor 10 preferably has a rectangular parallelepiped shape or a substantially rectangular parallelepiped shape as a whole, and includes a laminate 11 and a pair of external electrodes 14 (14a and 14b). The pair of external electrodes 14 (14a and 14b) face each other as illustrated in FIG. 1.

Here, the direction in which the pair of external electrodes 14 face each other is defined as a length direction L of the multilayer ceramic capacitor 10, the lamination direction of internal electrodes 13 (13a, 13b) described later is defined as a lamination direction T, and the direction orthogonal or substantially orthogonal to either of the length direction L and the lamination direction T is defined as a width direction W.

The size of the multilayer ceramic capacitor 10 is preferably, for example, about 0.2 mm to about 3.2 mm (inclusive) in dimension in the length direction L, about 0.1 mm to about 1.6 mm (inclusive) in dimension in the width direction W, and about 0.1 mm to about 1.6 mm (inclusive) in dimension in the lamination direction T.

The laminate 11 includes a first end surface 15a and a second end surface 15b opposite to each other in the length direction L, a first main surface 16a and a second main surface 16b opposite to each other in the lamination direction T, and a first side surface 17a and second side surface 17b opposite to each other in the width direction W.

The first end surface 15a and the second end surface 15b extend along the width direction W and the lamination direction T. The first main surface 16a and the second main surface 16b extend along the length direction L and the width direction W. The first side surface 17a and the second side surface 17b extend along the length direction L and the lamination direction T.

The laminate 11 preferably has rounded corner portions and ridge line portions. Here, the corner portion is a portion at which the three surfaces of the laminate 11 intersect, and the ridge line portion is a portion at which the two surfaces of the laminate 11 intersect.

As illustrated in FIGS. 2 and 3, the laminate 11 includes an inner layer portion 21, outer layer portions 22, and side margin portions 23.

The inner layer portion 21 includes dielectric layers 12, first internal electrodes 13a, and second internal electrodes 13b. The dielectric layer 12 is sandwiched between the first internal electrode 13a and the second internal electrode 13b. The inner layer portion 21 is provided by alternately laminating the plurality of first internal electrodes 13a and the plurality of second internal electrodes 13b with the dielectric layers 12 interposed therebetween.

The dielectric layer 12 preferably includes a dielectric material including Ba and Ti as main components, and for example, includes about 90 mol % or more of Ba and Ti in combination. More specifically, the dielectric layer 12 preferably includes a perovskite compound with Ba and Ti as main components, and includes dielectric ceramic particles having a perovskite structure. At least one of Si, Mg, and Ba, for example, may be included in these main components as an additive. The dielectric layers 12 may also include rare earth elements, for example, Dy, Y and Ho. However, the dielectric layer 12 does not include Ca and Zr. The thickness of the dielectric layers 12 is preferably, for example, about 0.3 μm or more and about 0.8 μm or less.

The first internal electrode 13a and the second internal electrode 13b face each other in the lamination direction T with the dielectric layer 12 interposed therebetween. Capacitance is generated in a portion where the first internal electrode 13a and the second internal electrode 13b face each other with the dielectric layer 12 interposed therebetween.

The dielectric layer 12 extends in the width direction W and the length direction L. The first internal electrode 13a extends flatly along the dielectric layer 12 and is drawn to the first end surface 15a of the laminate 11. The second internal electrode 13b extends flatly along the dielectric layer 12 and is drawn to the second end surface 15b of the laminate 11.

The first internal electrode 13a and the second internal electrode 13b preferably include, for example, Cu. The first internal electrode 13a and the second internal electrode 13b may include, in addition to Cu, other metal(s), for example, Ni, Ag, Pd, an Ag—Pd alloy, or Au. The first internal electrode 13a and the second internal electrode 13b may include the same dielectric particles or similar dielectric particles as the dielectric layer 12.

The number of laminated internal electrodes 13 including the first internal electrodes 13a and the second internal electrodes 13b is preferably, for example, about 10 or more and about 500 or less. The thickness of the first internal electrode 13a and the second internal electrode 13b is preferably, for example, about 0.3 µm or more and about 0.8 µm or less.

When the cross section including the width direction W and the lamination direction T of the multilayer ceramic capacitor 10 is viewed from the length direction L, the positions of the end portions of the internal electrodes 13 are aligned in the lamination direction T, or may have such a positional relationship that the central portion in the lamination direction bulges outward compared to the outer sides in the lamination direction. In other words, the dimensions in the width direction W of the internal electrodes 13 located at the central portion in the lamination direction T are equal to or larger than the dimensions in the width direction W of the internal electrodes 13 located on the outer side in the lamination direction T.

The outer layer portions 22 are provided on both outer sides in the lamination direction T of the inner layer portion 21. That is, the inner layer portion 21 is sandwiched between the two outer layer portions 22 provided on both outer sides in the lamination direction T. The outer layer portions 22 each correspond to a region in which none of the first internal electrode 13a and the second internal electrode 13b exist except for the side margin portions 23 described later when a freely-selected cross section including the lamination direction T and the width direction W of the laminate 11 is viewed from the length direction L. The outer layer portions 22 are each preferably a dielectric including the same material or a similar material as the dielectric layer 12.

The dimensions in the lamination direction T of the outer layer portions 22, that is, a distance between the internal electrode at a position closest to the first main surface 16a among the first internal electrodes 13a and the second internal electrodes 13b, and the first main surface 16a and a distance between the internal electrode at a position closest to the second main surface 16b among the first internal electrodes 13a and the second internal electrodes 13b and the second main surface 16b are each preferably, for example, about 5 µm or more and about 30 µm or less.

The side margin portions 23 each correspond to a region in which none of the first internal electrode 13a and the second internal electrode 13b exists when a freely-selected cross section including the length direction L and the width direction W of the laminate 11 is viewed from the lamination direction T. As illustrated in FIG. 3, the side margin portions 23 are located on both outer sides in the width direction W. That is, the two side margin portions 23 are provided to sandwich the inner layer portion 21 and the outer layer portions 22 in the width direction W.

In the present preferred embodiment, the side margin portion 23 includes a plurality of side margin layers laminated in the width direction W. Specifically, the side margin portion 23 includes an outer side margin layer 23a and an inner side margin layer 23b. The outer side margin layers 23a are located on the first side surface 17a side and the second side surface 17b side of the laminate 11. Further, the inner side margin layers 23b are located on the inner layer portion 21 side.

It should be noted that the side margin portion 23 includes the plurality of side margin layers 23a and 23b, and the boundary is able to be easily confirmed by observation with an optical microscope due to the difference in the sinterability between the outer side margin layer 23a and the inner side margin layer 23b. That is, the boundary exists between the outer side margin layer 23a and the inner side margin layer 23b.

The dimension in the width direction W of the side margin portion 23 is preferably, for example, about 5 µm or more and about 30 µm or less. In the present preferred embodiment, the dimension in the width direction W of the outer side margin layer 23a is larger than the dimension in the width direction W of the inner side margin layer 23b.

The dimension in the width direction W of the side margin portion 23 is an average dimension obtained by measuring dimensions of the side margin portion 23 at a plurality of locations along the lamination direction T and calculating an average based on the measurement results. The measuring method of the dimension in the width direction W of the side margin portion 23 is as follows.

First, a surface including the width direction W and the lamination direction T of the multilayer ceramic capacitor 10 is exposed. This surface is hereinafter referred to as a "WT cross section". Next, an image is taken with an optical microscope so that the end portions in the width direction W of the first internal electrodes 13a and the second internal electrodes 13b in the WT cross section and any one of the two side margin portions 23 located on both the outer sides in the width direction W are captured within the same field of view or substantially the same field of view. There are three imaging locations of an upper portion, a central portion, and a lower portion in the lamination direction T. Then, in the upper portion, the central portion, and the lower portion, a plurality of line segments parallel or substantially parallel to the width direction W are drawn from the end portions in the width direction W of the first internal electrodes 13a and the second internal electrodes 13b toward the first side surface 17a or the second side surface 17b, and the lengths of the line segments are measured. The average value of the lengths of the line segments measured, as described above, at each of the upper portion, the central portion, and the lower portion is calculated. Further, the average values are further averaged to obtain a dimension in the width direction W of the side margin portion 23.

The side margin portion 23 preferably includes a dielectric with Ca, Zr, and Ti, for example. That is, the side margin portion 23 includes a dielectric ceramic material with Ca, Zr, and Ti as main components. The side margin portion 23 preferably further includes Si, for example, as an additive. Each component is able to be observed by WDX or TEM.

The outer side margin layer 23a includes a larger content of Si than the inner side margin layer 23b. That is, the molar ratio of Si/Ti of the outer side margin layer 23a is higher than the molar ratio of Si/Ti of the inner side margin layer 23b. Since Si functions as a sintering aid, the outer side margin layer 23a provided by firing in manufacturing the multilayer ceramic capacitor 10 includes a denser structure than the inner side margin layer 23b. With this, the strength of the side margin portion 23 is able to be significantly improved, so that the side margin portion 23 is unlikely to be cracked or chipped, thus being able to significantly reduce or prevent the entry of moisture into the inside. Each component can be observed by WDX or TEM.

A first external electrode 14a is provided on the entire or substantially the entire first end surface 15a of the laminate 11, and wraps around the first main surface 16a, the second main surface 16b, the first side surface 17a, and the second side surface 17b, from the first end surface 15a. The first external electrode 14a is electrically connected to the first internal electrodes 13a.

A second external electrode 14b is provided on the entire or substantially the entire second end surface 15b of the laminate 11, and wraps around the first main surface 16a, the second main surface 16b, the first side surface 17a, and the second side surface 17b, from the second end surface 15b. The second external electrode 14b is electrically connected to the second internal electrodes 13b.

In the present preferred embodiment, as illustrated in FIG. 2, the first external electrode 14a includes a three-layer structure including a first base electrode layer 141a, a first lower plating layer 141b provided on the surface of the first base electrode layer 141a, and a first upper plating layer 141c provided on the surface of the first lower plating layer 141b.

The first base electrode layer 141a covers the entire or substantially the entire first end surface 15a of the laminate 11, and covers a portion of each of the first side surface 17a and the second side surface 17b and a portion of each of the first main surface 16a and the second main surface 16b, from the portion covering the first end surface 15a.

Further, in the present preferred embodiment, as illustrated in FIG. 2, the second external electrode 14b includes a three-layer structure including a second base electrode layer 142a, a second lower plating layer 142b provided on the surface of the second base electrode layer 142a, and a second upper plating layer 142c provided on the surface of the second lower plating layer 142b.

The second base electrode layer 142a covers the entire or substantially the entire second end surface 15b of the laminate 11, and covers a portion of each of the first side surface 17a and the second side surface 17b and a portion of each of the first main surface 16a and the second main surface 16b, from the portion covering the second end surface 15b.

The first base electrode layer 141a and the second base electrode layer 142a preferably include, for example, metal (s) such as Ni, Cu, Ag, Pd, an Ag—Pd alloy, or Au. The first base electrode layer 141a and the second base electrode layer 142a may be a plurality of layers.

The first base electrode layer 141a and the second base electrode layer 142a may be formed by co-firing in which the first base electrode layer 141a and the second base electrode layer 142a are fired with the first internal electrodes 13a and the second internal electrodes 13b at the same time, or may be formed by post-fire in which conductive paste is applied on the laminate 11 and the first base electrode layer 141a and the second base electrode layer 142a are fired. In the case of formation by co-firing, for example, the first internal electrode 13a and the second internal electrode 13b may include Ni, and the first base electrode layer 141a and the second base electrode layer 142a may also include Ni. In the case of formation by the co-firing, the first base electrode layer 141a and the second base electrode layer 142a include a common material made of a dielectric material shared with the dielectric layer (note that the common material is a dielectric material which is commonly used (i.e. shared) in the electrode layer and the dielectric layer). The first base electrode layer 141a and the second base electrode layer 142a preferably include three or more times by weight of the common material as compared with the common material included in the internal electrode. The first base electrode layer 141a and the second base electrode layer 142a may be formed by direct plating, or may be formed by curing a resin layer including conductive particles and thermosetting resin.

It is preferable that the first lower plating layer 141b and the second lower plating layer 142b include Ni, for example, in order to prevent solder breakage. However, the first lower plating layer 141b and the second lower plating layer 142b may include, for example, metal(s) such as Cu, Ag, Pd, an Ag—Pd alloy, or Au in addition to Ni.

It is preferable that the first upper plating layer 141c and the second upper plating layer 142c include Sn, for example, in order to significantly improve the mountability. However, the first upper plating layer 141c and the second upper plating layer 142c may include, for example, metal(s) such as Cu, Ag, Pd, an Ag—Pd alloy, or Au, in addition to Sn.

The configurations of the first external electrode 14a and the second external electrode 14b are not limited to the configurations described above. For example, by directly plating the laminate 11, the first external electrode 14a and the second external electrode 14b may be formed by plating.

(Circuit Board on which Multilayer Ceramic Capacitor is Mounted)

The multilayer ceramic capacitor 10 described above is able to be mounted on a circuit board so that the side margin portion 23 faces the mounting surface of the circuit board.

Figure 4:
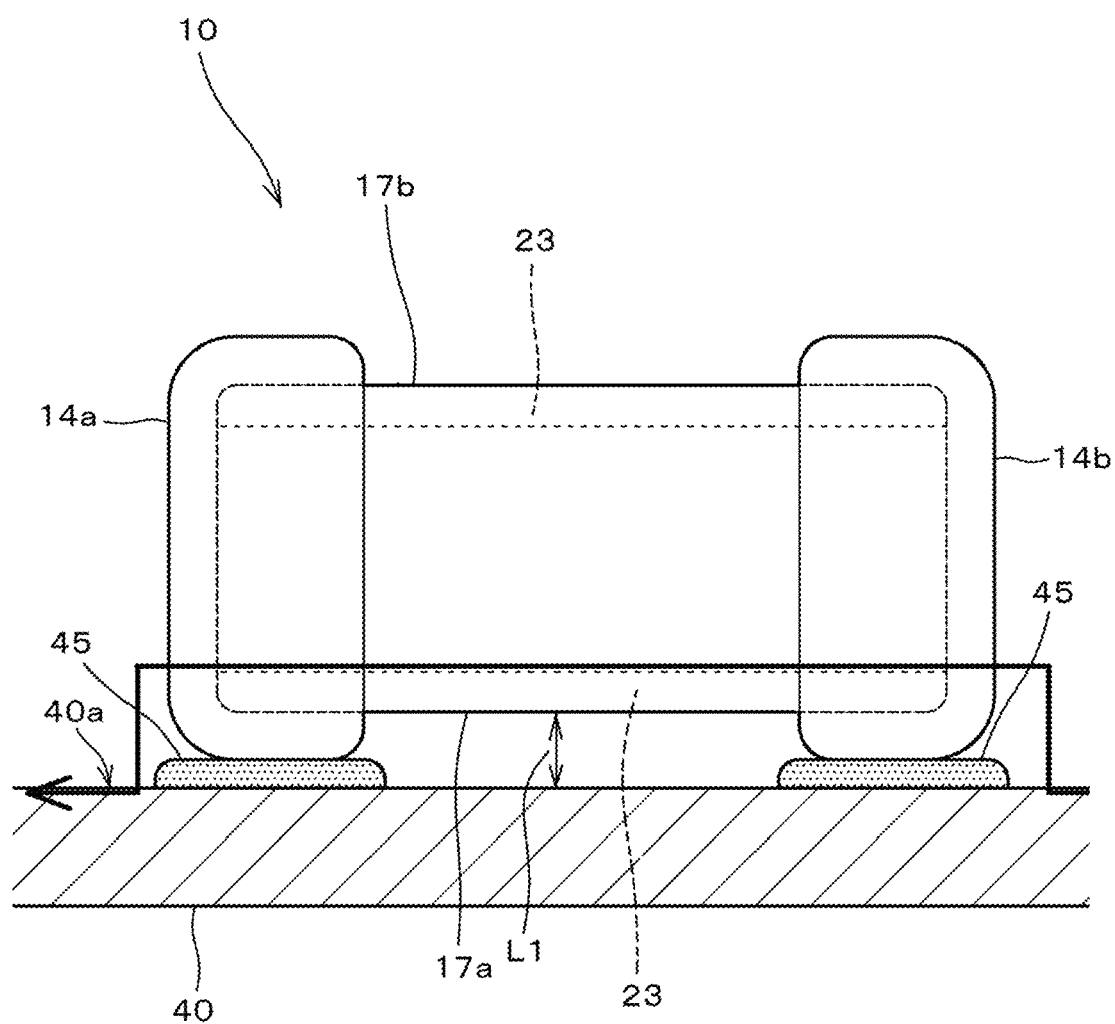
FIG. 4 is a view of a state in which the multilayer ceramic capacitor is mounted on a circuit board.

FIG. 4 is a view of a state in which the multilayer ceramic capacitor 10 is mounted on a circuit board 40. The multilayer ceramic capacitor 10 is mounted so that the side margin portion 23 faces a mounting surface 40a of the circuit board 40. More specifically, the first external electrode 14a and the second external electrode 14b of the multilayer ceramic capacitor 10 are mounted by each being joined to a land electrode provided on the mounting surface 40a of the circuit board 40 by solder 45.

In the example illustrated in FIG. 4, the side margin portion 23 located on the first side surface 17a side is mounted to face the mounting surface 40a of the circuit board 40, but the side margin portion 23 located on the second side surface 17b side may be mounted to face the mounting surface 40a of the circuit board 40.

In the mounted state illustrated in FIG. 4, the lamination direction of the first internal electrodes 13a and the second internal electrodes 13b are parallel or substantially parallel to the extending direction of the mounting surface 40a of the circuit board 40.

A distance L1 between the end portion of the multilayer ceramic capacitor 10 on the circuit board 40 side and the mounting surface 40a of the circuit board 40 is preferably, for example, about 20 µm or more and about 50 µm or less.

In a high frequency band, a skin effect concentrates current on the surface of a conductor. Therefore, the current flowing in the multilayer ceramic capacitor 10 mounted on the circuit board 40 flows in the vicinity of the surface of the internal electrode 13 closest to the mounting surface 40a of the circuit board 40 as indicated by the arrow in FIG. 4. In this case, the configuration of the side margin portion 23 on the side close to the mounting surface 40a of the substrate 40 greatly affects a current loss, but in the present preferred embodiment, the side margin portion 23 preferably includes Ca, Zr, and Ti, for example, as main components. That is, since the side margin portion 23 includes Ca, Zr and Ti as main components included in a dielectric of a temperature compensating capacitor which is able to provide good high frequency characteristics, the current loss is able to be reduced, and the high frequency characteristics are able to be significantly improved.

In addition, since the multilayer ceramic capacitor 10 in the present preferred embodiment is manufactured by bonding, later, ceramic green sheets defining the side margin portions 23 as described later, the dimension in the width direction W of the side margin portions 23 is able to be shortened. With this, the distance between the circuit board 40 and the position where the current flows in the multilayer ceramic capacitor 10 is able to be shortened, so that a current path is able to be shortened, and an equivalent series inductance (ESL) is able to be reduced.

Furthermore, the dielectric layers 12 of the inner layer portion 21 each include Ba and Ti but do not include Ca and Zr, so that the capacitance per volume of the multilayer ceramic capacitor 10 is able to be increased.

The advantageous effects described above are advantageous effects of the circuit board 40 on which the multilayer ceramic capacitor 10 is mounted, and also advantageous effects of the multilayer ceramic capacitor 10 itself.

(Method of Manufacturing Multilayer Ceramic Capacitor)

Figure 5A:
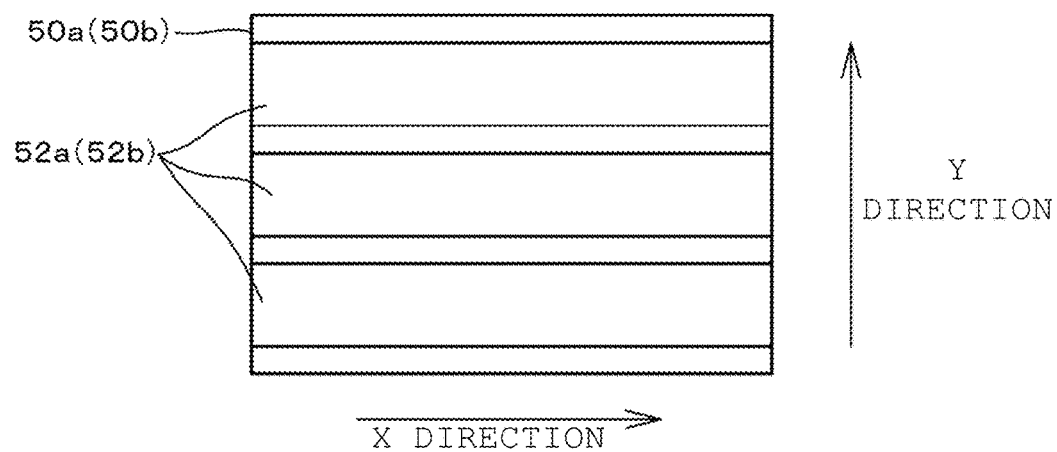
Figure 5B:
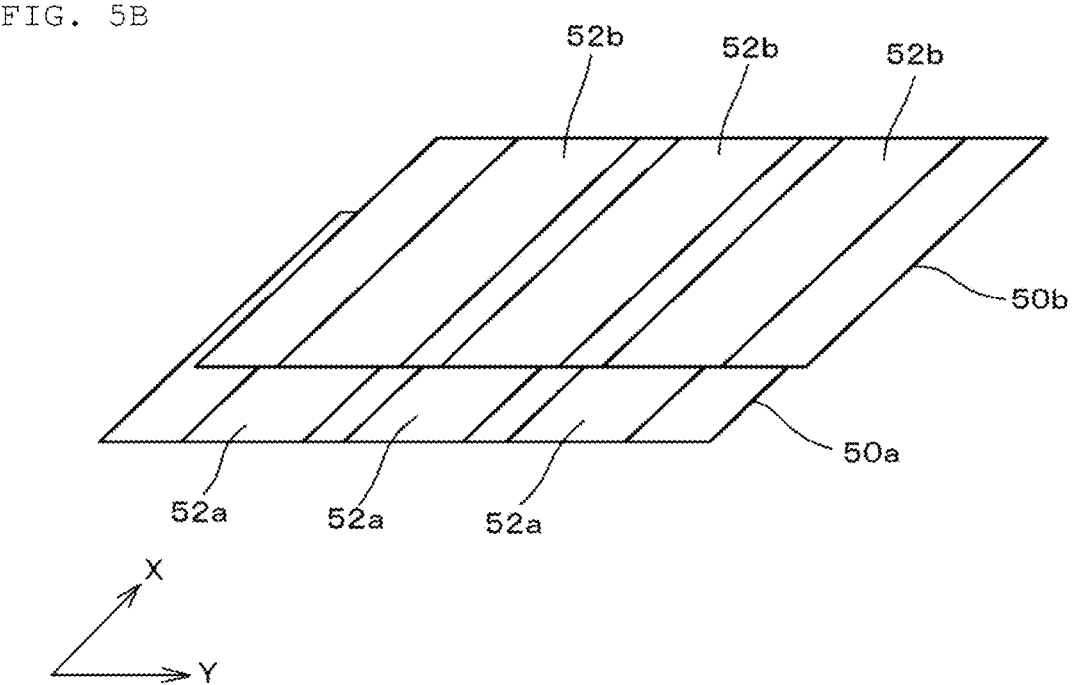
Figure 6:
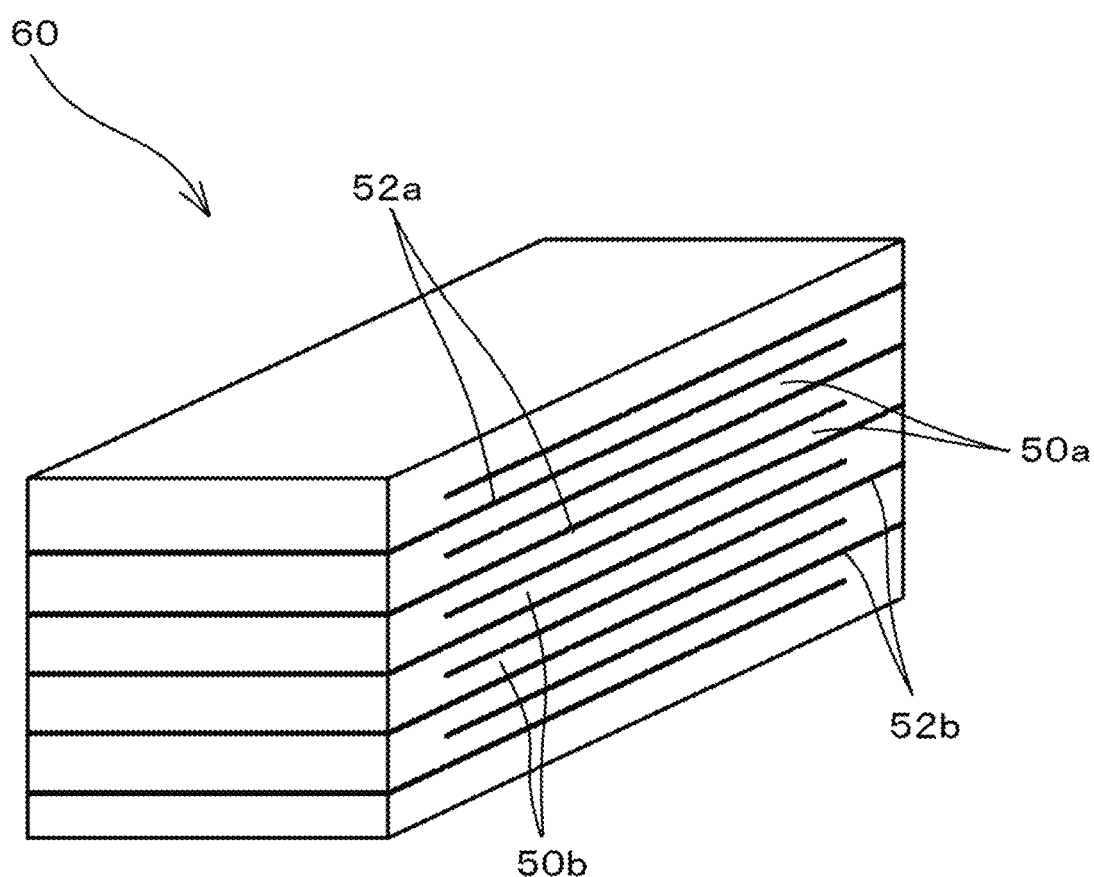
FIG. 6 is a perspective view of an example of the appearance of a laminate chip prepared in the middle of the manufacture of the multilayer ceramic capacitor 10.

Hereinafter, an example of the method of manufacturing the multilayer ceramic capacitor 10 which includes the structure described above is described. FIGS. 5A and 5B are views of an example of the method of manufacturing the multilayer ceramic capacitor 10 according to a preferred embodiment of the present invention, in which FIG. 5A is a schematic view of a ceramic green sheet on which conductive films are provided, and FIG. 5B is a schematic view of a state in which the ceramic green sheets on which conductive films are provided are being laminated. FIG. 6 is a perspective view of an example of the appearance of a laminate chip prepared in the middle of the manufacture of the multilayer ceramic capacitor 10.

First, a perovskite compound including Ba and Ti is prepared as a dielectric material. A ceramic slurry is prepared by mixing, as additives, at least one of Si, Mg, and Ba, an organic binder, an organic solvent, a plasticizer, and a dispersant in a predetermined ratio with dielectric powder obtained from the dielectric material.

Then, ceramic green sheets 50a and 50b are prepared by applying the prepared ceramic slurry on the surfaces of a plurality of resin films (not shown). The ceramic green sheets 50b are alternately laminated with the ceramic green sheets 50a. The ceramic green sheets 50a and 50b may preferably be prepared, for example, by a die coater, a gravure coater, a microgravure coater, or the like.

Next, as illustrated in FIG. 5A, conductive paste that defines internal electrodes is printed in stripes on the surfaces of the ceramic green sheets 50a and 50b, and dried. The conductive paste that defines the internal electrodes includes Cu. Here, the direction in which the conductive paste that defines the internal electrodes extends in stripes is defined as an X direction, and the direction orthogonal or substantially orthogonal to the X direction on the ceramic green sheet is defined as a Y direction. Thus, conductive films 52a (52b) to be the first internal electrodes 13a (second internal electrodes 13b) are formed. As the printing method, various methods, including screen printing, ink jet printing, gravure printing, and the like, may preferably be used.

Next, the prepared ceramic green sheets are laminated. Specifically, after a predetermined number of ceramic green sheets on which conductive films are not formed to be the outer layer portion 22 are laminated, the plurality of ceramic green sheets 50a and 50b on which the conductive films 52a and 52b are formed are laminated while being mutually shifted in the Y direction, as illustrated in FIG. 5B. Then, a predetermined number of ceramic green sheets on which conductive films are not formed to be the outer layer portion 22 are laminated thereon to obtain a mother laminate.

Subsequently, the mother laminate is pressed by, for example, a method such as rigid press or isostatic press. Then, the pressed mother laminate is cut into a chip shape, so that a laminate chip 60 illustrated in FIG. 6 is provided.

As illustrated in FIG. 6, only the conductive films 52a of the ceramic green sheets 50a are exposed at one end surface of the laminate chip 60, and only the conductive films 52b of the ceramic green sheets 50b are exposed at the other end surface. Further, on both side surfaces of the laminate chip 60, the conductive films 52a of the ceramic green sheets 50a and the conductive films 52b of the ceramic green sheets 50b are exposed.

Subsequently, ceramic green sheets that define side margin portions to be the side margin portions 23 are prepared. A compound including Ca, Zr, and Ti is prepared as a dielectric material for preparing a ceramic green sheet that defines a side margin portion. A ceramic slurry is prepared by mixing an additive including at least Si, an organic binder, an organic solvent, a plasticizer, and a dispersant in a predetermined ratio with dielectric powder obtained from the dielectric material. Subsequently, the ceramic green sheets that define the side margin portions are prepared with the prepared ceramic slurry.

Here, when the ceramic slurry is to be prepared, the content of Si included in the ceramic slurry that defines the outer side margin layer 23a is adjusted to be larger than the content of Si included in the ceramic slurry that defines the inner side margin layer 23b. Further, the ceramic slurry is applied so that the thickness of the ceramic green sheet that defines the outer side margin layer 23a is larger than the thickness of the ceramic green sheet that defines the inner side margin layer 23b.

Subsequently, the ceramic green sheet that defines an inner side margin layer is laminated and bonded onto the ceramic green sheet that defines an outer side margin layer to provide a ceramic green sheet that defines a side margin portion with a two-layer structure.

Subsequently, of the ceramic green sheets that defines a side margin portion, the ceramic green sheet that defines an inner side margin layer, and the side surface of the laminate chip 60 to which the conductive films 52a and 52b are exposed face each other, and pressing and punching are preformed, to thus form a layer to be the side margin portion 23. A layer to be the side margin portion 23 is formed on the side surface on the opposite side by the same method or a similar method.

Subsequently, barrel polishing of the laminate chip on which the layer to be the side margin portion 23 is provided is performed. Then, the laminate chip is subjected to degreasing treatment under a predetermined condition in a nitrogen atmosphere, and then firing treatment is performed at a predetermined temperature in a nitrogen-hydrogen-steam mixed atmosphere. With this, a sintered laminate is provided.

Next, external electrode paste including Cu as a main component is applied and baked on each end surface of the sintered laminate to form the first base electrode layer 141a connected to the first internal electrodes 13a and the second base electrode layer 142a connected to the second internal electrodes 13b. Subsequently, the first lower plating layer 141b is formed by Ni plating on the surface of the first base electrode layer 141a, and the first upper plating layer 141c is formed by Sn plating on the surface of the first lower plating layer 141b. Accordingly, the first external electrode 14a is formed. The second external electrode 14b is formed by the same method or a similar method.

However, the laminate chip and the external electrode paste may be fired at the same time.

The multilayer ceramic capacitor 10 is prepared by the method described above. However, the manufacturing method described above is an example, and the method of manufacturing multilayer ceramic capacitor 10 is not limited to the manufacturing method described above.

The present invention is not limited to the preferred embodiment described above, and various applications and modifications may be applied within the scope of the present invention.

For example, although the side margin portion 23 is described as including the two side margin layers 23a and 23b laminated in the width direction W in the preferred embodiment described above, the side margin portion 23 may include one side margin layer or may include three or more side margin layers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component, comprising:
a laminate including an inner layer portion including first internal electrodes and second internal electrodes that are alternately laminated in a lamination direction with dielectric layers interposed between the first internal electrodes and the second internal electrodes, and outer layer portions that sandwich the inner layer portion in the lamination direction, the laminate further including:
a first main surface and a second main surface opposite to each other in the lamination direction;
a first side surface and a second side surface opposite to each other in a width direction orthogonal or substantially orthogonal to the lamination direction; and
a first end surface and a second end surface opposite to each other in a length direction orthogonal or substantially orthogonal to the lamination direction and the width direction;
a first external electrode provided on at least the first end surface of the laminate and electrically connected to the first internal electrodes; and
a second external electrode provided on at least the second end surface of the laminate and electrically connected to the second internal electrodes; wherein
when a cross section including the length direction and the width direction of the laminate is viewed from the lamination direction, side margin portions each include a dielectric including Ca, Zr, and Ti, each of the side margin portions being a region in which none of the first internal electrodes and the second internal electrodes are disposed;
each of the side margin portions includes a first portion and a second portion, and the first portion of the side margin portion is closer to the first and second internal electrodes than the second portion of the side margin portion in the width direction;
each of the side margin portions includes Si, and a molar ratio of Si/Ti in the second portion is higher than a molar ratio of Si/Ti in the first portion; and
the dielectric layers include a different dielectric composition from that of the side margin portions.

2. The electronic component according to claim 1, wherein each of the dielectric layers between each of the first internal electrodes and each the second internal electrodes includes a dielectric material including Ba and Ti as main components.

3. The electronic component according to claim 1, wherein a dimension of the side margin portions in the width direction is about 5 μm or more and about 30 μm or less.

4. The electronic component according to claim 1, wherein
a number of laminated internal electrodes including the first internal electrodes and the second internal electrodes is 10 or more and 500 or less;
a distance between the first main surface and an internal electrode at a position closest to the first main surface among the first internal electrodes and the second internal electrodes is about 5 μm or more and about 30 μm or less; and
a distance between the second main surface and an internal electrode at a position closest to the second main surface among the first internal electrodes and the second internal electrodes is about 5 μm or more and about 30 μm or less.

5. The electronic component according to claim 1, wherein the first internal electrodes and the second internal electrodes each include Cu.

6. The electronic component according to claim 1, wherein
the electronic component includes:
a dimension in the length direction of about 0.2 mm or more and about 3.2 mm or less;
a dimension in the width direction of about 0.1 mm or more and about 1.6 mm or less; and
a dimension in the lamination direction of about 0.1 mm or more and about 1.6 mm or less.

7. A circuit board on which the electronic component according to claim 1 is mounted, wherein the electronic component is mounted so that the side margin portions of the electronic component face a mounting surface of the circuit board.

8. The circuit board according to claim 7, wherein a distance between an end portion of the electronic component on a circuit board side and the mounting surface of the circuit board is about 20 μm or more and about 50 μm or less.

9. A method of mounting the electronic component according to claim 1 on a circuit board, the method comprising:
mounting the electronic component on the circuit board so that the side margin portions of the electronic component face a mounting surface of the circuit board.

10. The electronic component according to claim 1, wherein the first external electrode and the second external electrode face each other.

11. The electronic component according to claim 1, wherein the side margin portions extend from the first main surface to the second main surface.

12. The electronic component according to claim 11, wherein each of the outer layer portions is a region in which none of the first internal electrodes and the second internal electrodes are disposed and includes at least one dielectric layer.

13. The electronic component according to claim 1, wherein the side margin portions include a plurality of side margin layers laminated in the width direction.

14. The electronic component according to claim 13, wherein the first portions of the side margin portions include inner side margin layers of the plurality of side margin layers, and the second portions of the side margin portions include outer side margin layers of the plurality of side margin layers.

15. The electronic component according to claim 14, wherein a dimension in the width direction of the outer side margin layers is larger than a dimension in the width direction of the inner side margin layers.

16. The electronic component according to claim 1, wherein
the first external electrode is provided on an entirety or substantially an entirety of the first end surface of the laminate; and
the second external electrode is provided on an entirety or substantially an entirety of the second end surface of the laminate.

17. The electronic component according to claim 1, wherein
the first external electrode includes a three-layer structure including a first base electrode layer, a first lower plating layer provided on a surface of the first base electrode layer, and a first upper plating layer provided on a surface of the first lower plating layer; and
the second external electrode includes a three-layer structure including a second base electrode layer, a second lower plating layer provided on a surface of the second base electrode layer, and a second upper plating layer provided on a surface of the second lower plating layer.

18. The electronic component according to claim 17, wherein
the first base electrode layer is provided on an entirety or substantially an entirety of the first end surface of the laminate; and
the second base electrode layer is provided on an entirety or substantially an entirety of the second end surface of the laminate.

19. The electronic component according to claim 1, wherein
the first external electrode includes a first base electrode layer;
the second external electrode includes a second base electrode layer;
the first base electrode layer is provided on the first end surface of the laminate and extends to each of the first and second main surfaces and the first and second side surfaces of the laminate; and
the second base electrode layer is provided on the second end surface of the laminate and extends to each of the first and second main surfaces and the first and second side surfaces of the laminate.

20. An electronic component, comprising:
a laminate including an inner layer portion including first internal electrodes and second internal electrodes that are alternately laminated in a lamination direction with dielectric layers interposed between the first internal electrodes and the second internal electrodes, and outer layer portions that sandwich the inner layer portion in the lamination direction, the laminate further including:
a first main surface and a second main surface opposite to each other in the lamination direction;
a first side surface and a second side surface opposite to each other in a width direction orthogonal or substantially orthogonal to the lamination direction; and
a first end surface and a second end surface opposite to each other in a length direction orthogonal or substantially orthogonal to the lamination direction and the width direction;
a first external electrode provided on at least the first end surface of the laminate and electrically connected to the first internal electrodes; and
a second external electrode provided on at least the second end surface of the laminate and electrically connected to the second internal electrodes; wherein
when a cross section including the length direction and the width direction of the laminate is viewed from the lamination direction, side margin portions each include a dielectric including Ca, Zr, and Ti, each of the side margin portions being a region in which none of the first internal electrodes and the second internal electrodes are disposed;
each of the side margin portions includes a first portion and a second portion, and the first portion of the side margin portion is closer to the first and second internal electrodes than the second portion of the side margin portion in the width direction;
each of the side margin portions includes Si, and a molar ratio of Si/Ti in the second portion is higher than a molar ratio of Si/Ti in the first portion; and
the dielectric layers include about 90 mol % or more of Ba and Ti in combination.

* * * * *